(12) United States Patent
Nishimura et al.

(10) Patent No.: US 7,894,558 B2
(45) Date of Patent: Feb. 22, 2011

(54) RECEIVING CIRCUIT FOR MULTI-SLOT RECEIVING PROVIDED WITH CIRCUIT FOR ADJUSTING FREQUENCY CHARACTERISTIC OF ACTIVE FILTER

(75) Inventors: Mamoru Nishimura, Tokyo (JP); Koji Takahashi, Kanagawa (JP); Satoshi Yamaguchi, Kanagawa (JP); Tetsurou Yokota, Kanagawa (JP)

(73) Assignee: Panasonic Corporation, Osaka (JP)

( * ) Notice: Subject to any disclaimer, the term of this patent is extended or adjusted under 35 U.S.C. 154(b) by 709 days.

(21) Appl. No.: 11/592,150

(22) Filed: Nov. 3, 2006

(65) Prior Publication Data

US 2007/0116163 A1    May 24, 2007

(30) Foreign Application Priority Data

Nov. 7, 2005   (JP) .............................. 2005-321968

(51) Int. Cl.
*H04B 1/10* (2006.01)
(52) U.S. Cl. .................. 375/350; 375/316; 375/324; 375/328; 375/351; 455/311; 455/343.1; 455/574
(58) Field of Classification Search .................. 375/316, 375/324, 328, 350–351; 455/574, 343.1, 455/311; 370/311
See application file for complete search history.

(56) References Cited

U.S. PATENT DOCUMENTS

| | | | |
|---|---|---|---|
| 5,193,212 A * | 3/1993 | Son ............................ 340/7.36 |
| 6,304,517 B1 * | 10/2001 | Ledfelt et al. ................. 368/10 |
| 6,363,101 B1 | 3/2002 | Sudo et al. |
| 6,512,414 B2 | 1/2003 | Yokoyama et al. |
| 6,597,238 B1 * | 7/2003 | Matsumoto et al. ......... 329/300 |
| 6,680,868 B2 * | 1/2004 | Akamatsu .............. 365/189.04 |
| 6,865,276 B1 * | 3/2005 | Ljungberg et al. ......... 381/94.1 |

(Continued)

FOREIGN PATENT DOCUMENTS

CN    1380796    11/2002

(Continued)

OTHER PUBLICATIONS

A Basic Introduction to Filters-Active, Passive, and Switched Capacitor, by National Semiconductor, Apr. 1991.*

(Continued)

*Primary Examiner*—Mohammad H Ghayour
*Assistant Examiner*—Sophia Vlahos
(74) *Attorney, Agent, or Firm*—Wenderoth, Lind & Ponack, L.L.P.

(57) ABSTRACT

A receiver circuit controls a power source of a front-end circuit and a demodulator using a first power source control signal. Upon receiving data of a plurality of receiving slots having a guard bit provided between receiving slots adjacent to each other, the first power source control signal becomes a power source ON signal before starting receiving of the data, then becomes a power source OFF signal within the guard bit, and becomes a power source OFF signal after completing the receiving of the data. The receiver circuit controls a power source of an active filter circuit using a second power source control signal, which becomes a power source OFF signal after completing the receiving of the data after becoming a power source ON signal before starting the receiving of the data.

15 Claims, 15 Drawing Sheets

U.S. PATENT DOCUMENTS

| | | | |
|---|---|---|---|
| 6,963,736 B2* | 11/2005 | Tahtinen | 455/343.1 |
| 7,187,727 B2* | 3/2007 | Saeki | 375/327 |
| 7,289,784 B2* | 10/2007 | Nam | 455/339 |
| 7,400,868 B2 | 7/2008 | Fukusen et al. | |
| 7,633,561 B2* | 12/2009 | Krug et al. | 348/725 |
| 2005/0215226 A1 | 9/2005 | Tahtinen | |
| 2006/0046683 A1* | 3/2006 | Goddard | 455/343.5 |
| 2009/0103671 A1* | 4/2009 | Raphaeli et al. | 375/354 |

FOREIGN PATENT DOCUMENTS

| | | |
|---|---|---|
| JP | 11-284599 | 10/1999 |
| JP | 2002-94357 | 3/2002 |
| JP | 2002-300052 | 10/2002 |
| JP | 2005-197975 | 7/2005 |
| JP | 2005-236694 | 9/2005 |

OTHER PUBLICATIONS

Chinese Office Action issued Sep. 7, 2010 in corresponding Chinese Patent Application No. 200610172928.3 with partial English translation.

* cited by examiner

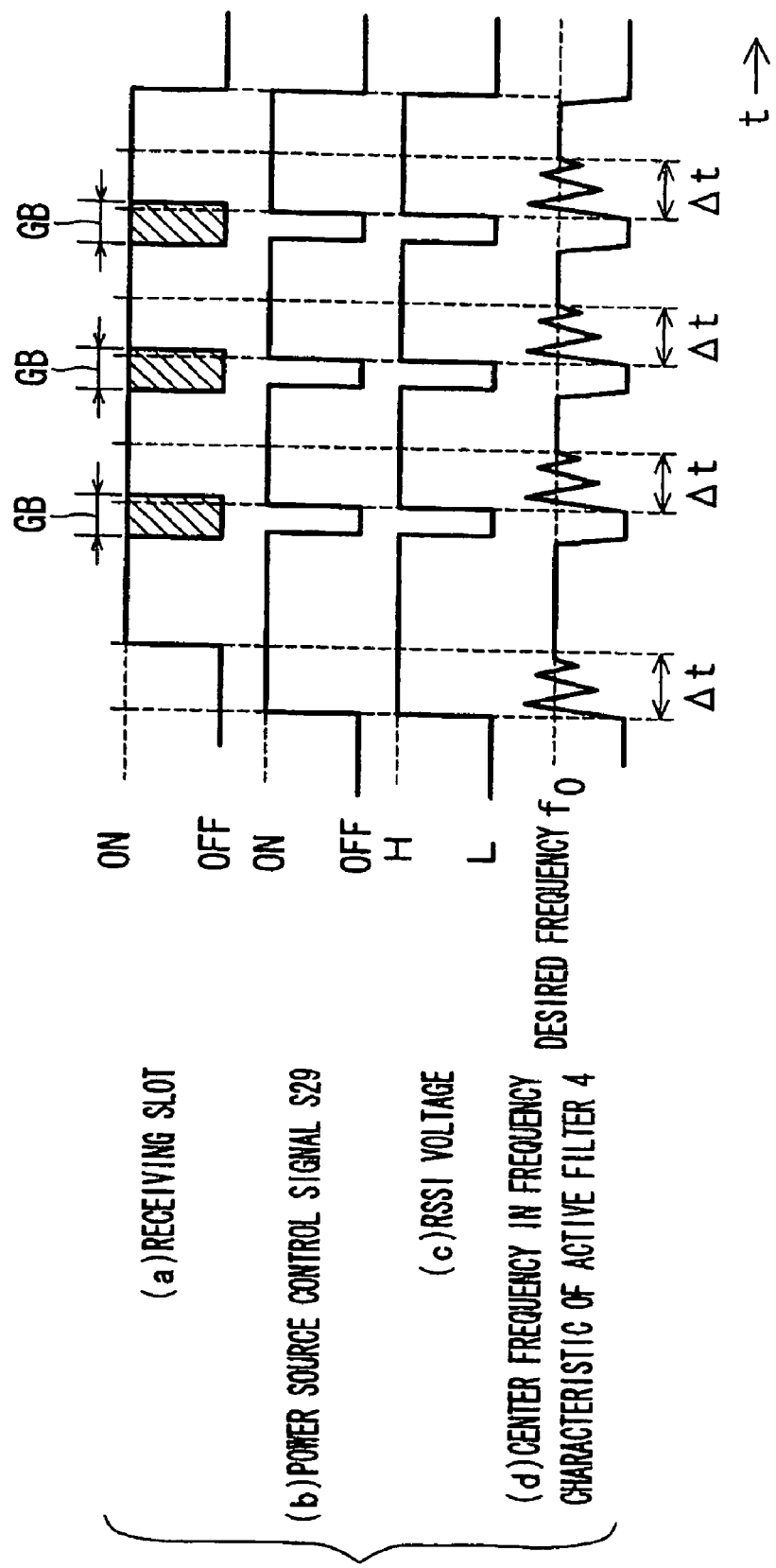

RECEIVING CIRCUIT FOR MULTI-SLOT RECEIVING PROVIDED WITH CIRCUIT FOR ADJUSTING FREQUENCY CHARACTERISTIC OF ACTIVE FILTER

BACKGROUND OF THE INVENTION

1. Field of the Invention

The present invention relates to a receiving circuit provided with an active filter for filtering and outputting an inputted transmission signal by a predetermined frequency characteristic, and a frequency characteristic adjusting circuit for adjusting the frequency characteristic of the active filter and performing multi-slot receiving, a transceiver circuit provided with the receiving circuit and a transmitting circuit, and a communication apparatus provided with the transceiver circuit.

2. Description of the Related Art

In the case where an active filter is incorporated in an integrated circuit (referred to as an IC hereinafter), there is such a case that the IC cannot obtain an expected frequency characteristic due to variation in elements such as a resistor, a capacitor, and a transistor upon manufacturing ICs. Therefore, most ICs in the case of incorporating an active filter include a frequency characteristic adjusting circuit for adjusting frequency characteristic. In this case, the frequency characteristic means the center frequency in a band pass filter (BPF) and a cut-off frequency in a high pass filter (HPF) or a low pass filter (LPF), respectively. In addition, the active filter means a filter manufactured by combining active elements such as an operational amplifier and a transistor with a configuration including a resistor, a capacitor, a coil and the like.

FIG. 13 is a timing chart showing an operation at the time of power source ON of an active filter incorporated in an IC, in a receiver circuit according to a prior art. The active filter starts to operate at a power source ON timing of a power source ON/power source OFF signal to the active filter, and frequency characteristic of the active filter is adjusted by a frequency characteristic adjusting circuit. An adjusting time $\Delta t$ is required until the frequency characteristic of the active filter is adjusted to a desired frequency $f_0$, and during this time, any data cannot be received. Although an example method for adjusting the frequency characteristic of the active filter is disclosed in Japanese patent laid-open publication No. JP-2002-94357-A, there is such a problem that it often needs a comparatively long time for adjustment for the frequency characteristic.

FIG. 14 is a schematic diagram showing an up frame configuration and a detail frame configuration of one receiving slot, in a personal handy-phone system (referred to as a PHS system hereinafter) according to a prior art.

In (a) of FIG. 14, an up frame from a terminal unit to a base station of the PHS system is constituted by including four transmitting slots TS1, TS2, TS3, and TS4 and four receiving slots RS1, RS2, RS3, and RS4. In (b) of FIG. 14, one receiving slot RS1 is constituted by including a Ramp time for transient response R (4 bits), a start symbol SS (2 bits), a preamble PR (6 bits), a synchronous word UW (16 bits), a channel type CI (4 bits), a slow associated control channel (SACCH) SA (16 bits) which is a control channel, a traffic channel TCH (160 bits), and a guard bit GB (18 bits).

FIG. 15 is a timing chart showing a relationship among a receiving slot, a power source control signal for a receiver circuit, and a receiving signal strength indicator (RSSI) voltage in multi-slot receiving of a receiver circuit for the PHS system according to the prior art. In this case, the multi-slot receiving is such a case that data receiving is performed using a plurality of bits as shown in FIG. 14, and FIG. 15 shows that data receiving is performed using four slots continuously.

The RSSI voltage is provided for showing a field strength of a desired wave received by an antenna by detecting a transmission signal level in an intermediate frequency amplifying circuit of a radio receiver circuit, for example, and the voltage is used for carrier sense, for example. The RSSI voltage is configured so as to output a DC voltage corresponding to an amplitude of an inputted radio frequency signal (referred to as an RF signal hereinafter), and an outputted DC voltage also becomes large when a signal level of the inputted RF signal is large. Therefore, upon performing carrier sense, when the RSSI voltage has a high level, it is judged that radio frequency thereof is used. In the present specification, a binary signal level is represented by a high level (or H level) and a low level (or L level).

The carrier sense is performed between the receiving slots in order to determine whether or not the next receiving slot is available. However, when the RSSI voltage at the previous slot is maintained to have the high level, the radio frequency is erroneously judged as being used and data cannot be received. Therefore, the field strength of the next slot needs to be detected after the RSSI voltage once falls to the low level. In order to lower the RSSI voltage to the low level, such an operation is required that the power source is turned OFF once between the receiving slots, and then is turned ON again to monitor the RSSI voltage. Between the slots, there is a no-signal time interval which is referred to as a guard bit GB, and a transient response due to power source ON/OFF needs to be ended during the time interval. In the case of the PHS system, the time interval of the guard bit GB is 41.7 μsec, and it is necessary that the power source is turned OFF within the time interval to lower the RSSI voltage into the low level, and then, the power source is turned ON again to receive the next slot.

FIG. 16 is a block diagram showing a receiver circuit 30C according to a prior art. Referring to FIG. 16, the receiver circuit 30C is constituted by including a front-end circuit 2, an active filter circuit 3 including an active filter 4 and a frequency characteristic adjusting circuit 5, a demodulator 6, and a power source ON/OFF control terminal 29.

An inputted RF signal is inputted to the front-end circuit 2, and the front-end circuit 2 low-noise amplifies the inputted RF signal, performs frequency conversion to a predetermined intermediate frequency signal, and then, outputs the same signal to the active filter 4 of the active filter circuit 3. In this case, the active filter circuit 3 is constituted by including the active filter 4 and the frequency characteristic adjusting circuit 5, and the frequency characteristic of the active filter 4 is adjusted by the frequency characteristic adjusting circuit 5. The RF signal inputted to the active filter circuit 3 is subject to band limitation according to the above-mentioned adjusted frequency characteristic and is outputted to the demodulator 6. In this case, a power source ON/OFF control terminal 29 is connected to the front-end circuit 2, the active filter circuit 3, and the demodulator 6, and the frequency adjustment operation of the active filter circuit 3 starts in response to a power source ON signal of the power source control signal S29 inputted via the power source ON/OFF control terminal 29.

However, in the configuration of the receiver circuit according to the above-mentioned prior art, since the power source of the active filter circuit 3 performs ON/OFF operation between slots at multi-slot receiving, there is such a problem that adjustment of the frequency characteristic starts at a timing of the power source ON signal and adjustment operation is not ended within the guard bit GB.

FIG. 17 is a timing chart showing a transient response operation at the multi-slot receiving of the receiver circuit 30C shown in FIG. 16. As is apparent from FIG. 17, FIG. 17 shows that any frequency adjustment of the active filter 4 is not ended within the guard bit GB.

BRIEF SUMMARY OF THE INVENTION

An object of the present invention is to solve the foregoing problems and to provide a receiver circuit capable of maintaining the frequency characteristic of an active filter between receiving slots, a transceiver circuit using the receiver circuit, and a communication apparatus using the transceiver circuit.

According to a first aspect of the present invention, there is provided a receiver circuit including an active filter circuit, a receiving circuit, and control device. The active filter circuit includes an active filter which filters an inputted transmission signal using a predetermined frequency characteristic, and an adjusting circuit which adjusts the frequency characteristic of the active filter. The receiving device includes a demodulator which demodulates the filtered transmission signal. The control device controls a power source of the receiving device using a first power source control signal, and controls a power source of the active filter circuit using a second power source control signal.

In the above-mentioned receiver circuit, the control device controls the power source of the receiving device using the first power source control signal. Upon receiving data of a plurality of receiving slots having a guard bit provided between receiving slots adjacent to each other, the first power source control signal becomes a power source ON signal before starting receiving of the data, the first power source control signal becomes a power source ON signal after temporarily becoming a power source OFF signal within the guard bit, and the first power source control signal becomes a power source OFF signal after completing the receiving of the data. The control device also controls the power source of the active filter circuit using the second power source control signal, which becomes a power source ON signal before starting the receiving of the data, and thereafter, becomes a power source OFF signal after completing the receiving of the data.

In the above-mentioned receiver circuit, the control device generates and outputs the power source OFF signal of the second power source control signal after a lapse of a predetermined delay interval from the power source OFF signal of the first power source control signal on the basis of the inputted first power source control signal.

In addition, in the above-mentioned receiver circuit, the control device includes a generator device which generates a reference signal having a predetermined reference frequency, and a frequency-dividing device which generates and outputs a frequency-divided signal showing the delay interval by dividing the frequency of the reference signal by a predetermined frequency-divided number.

Further, in the above-mentioned receiver circuit, the control device is configured to be able to change the delay interval.

Furthermore, in the above-mentioned receiver circuit, the control device includes a timer circuit which counts a time of the delay interval, and a logic circuit which generates and outputs the power source OFF signal of the second power source control signal after a lapse of the counted delay interval from the power source OFF signal of the first power source control signal.

In this case, in the above-mentioned receiver circuit, the timer circuit includes a counter circuit. Otherwise, in the above-mentioned receiver circuit, the timer circuit includes a charge and discharge circuit.

According to a second aspect of the present invention, there is provided a transceiver circuit including the receiver circuit and a transmitter circuit which transmits a transmission signal.

According to a third aspect of the present invention, there is provided a communication apparatus including the transceiver circuit.

Therefore, according to the receiver circuit of the present invention, there is provided with the control device which controls the power source of the receiving device using the first power source control signal, and controls the power source of the active filter circuit using the second power source control signal. More concretely, the control device controls the power source of the receiving device using the first power source control signal. Upon receiving the data of a plurality of receiving slots having the guard bit provided between receiving slots adjacent to each other, the first power source control signal becomes the power source ON signal before starting the receiving of the data, becomes the power source ON signal after temporarily becoming the power source OFF signal within the guard bit, and becomes the power source OFF signal after completing the receiving of the data. In addition, the control device also controls the power source of the active filter circuit using the second power source control signal, which becomes the power source OFF signal after completing receiving of the data after becoming the power source ON signal before starting the receiving of the data. Accordingly, there can be realized the receiver circuit which can maintain the frequency characteristic of the active filter between the receiving slots. This enables multi-slot receiving in the receiver circuit that uses the active filter which is advantageous for circuit integration and reduction in size.

BRIEF DESCRIPTION OF THE DRAWINGS

Various objects, features, and advantages according to the present invention will become apparent from the following described preferred embodiments with reference to the accompanying drawings, in which:

FIG. 17 is a timing chart showing a transient response operation at the multi-slot receiving of the receiver circuit 30C shown in FIG. 16.

DETAILED DESCRIPTION OF THE INVENTION

Figure 1:
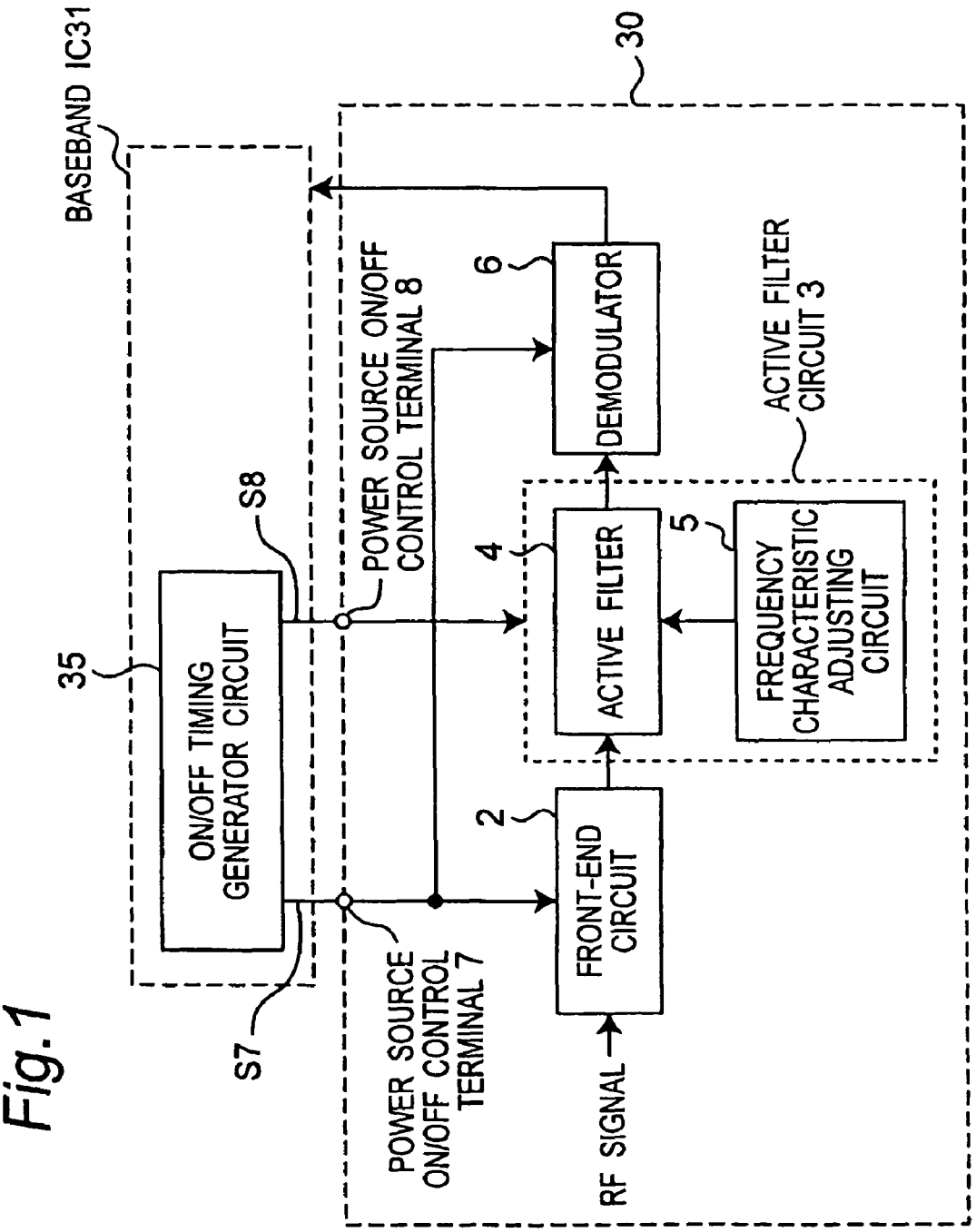
FIG. 1 is a block diagram showing a receiver circuit 30 according to a first preferred embodiment of the present invention.

Preferred embodiments according to the present invention will be described hereinafter with reference to the drawings. In addition, the same reference numerals are given to components similar to each other in the following preferred embodiments.

First Preferred Embodiment

Figure 16:
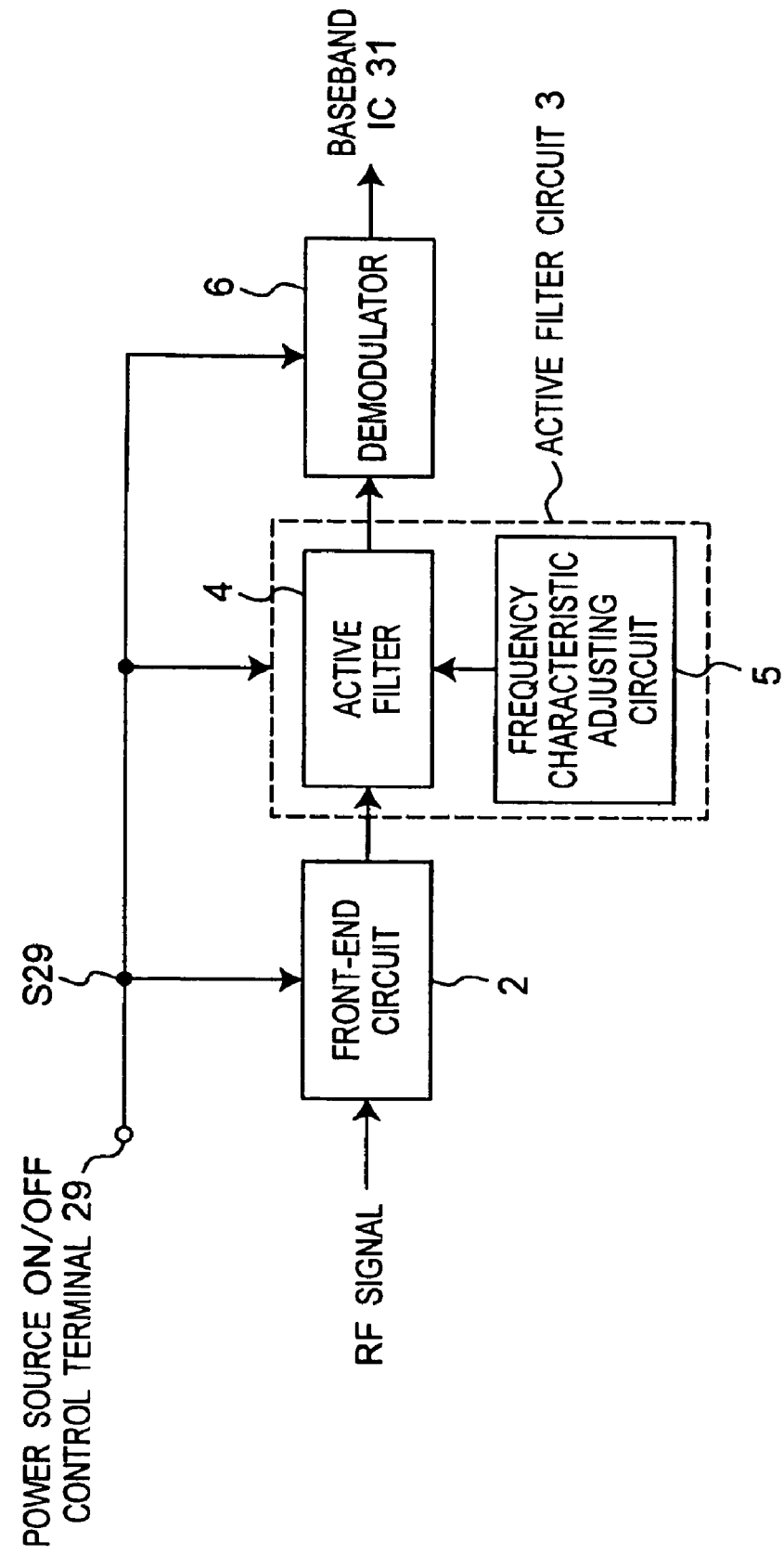
FIG. 16 is a block diagram showing a configuration of a receiver circuit 30C according to the prior art.

FIG. 1 is a block diagram showing a receiver circuit 30 for use in, for example, a radio communication apparatus of a PHS system according to a first preferred embodiment of the present invention. Referring to FIG. 1, the receiver circuit 30 according to the first preferred embodiment is constituted by including a front-end circuit 2, an active filter circuit 3 including an active filter 4 and a frequency characteristic adjusting circuit 5, a demodulator 6, and two power source ON/OFF control terminals 7 and 8. In particular, the receiver circuit 30 is characterized by including the two power source ON/OFF control terminals 7 and 8 which respectively inputs two control signals from an ON/OFF timing generator circuit 35 in a baseband IC31 which performs a baseband processing on an output signal from the demodulator 6, as compared with the receiver circuit 30C shown in FIG. 16 according to the prior art.

Referring to FIG. 1, an inputted RF signal is inputted to the front-end circuit 2, and the front-end circuit 2 amplifies the inputted RF signal, performs frequency conversion to an intermediate frequency signal, and then, outputs the same signal to the active filter 4 of the active filter circuit 3. In this case, the RF signal may be a radio signal, a high frequency signal, or a transmission signal. The active filter circuit 3 is constituted by including the active filter 4 and the frequency characteristic adjusting circuit 5, where the frequency characteristic of the active filter 4 is adjusted by the frequency characteristic adjusting circuit 5. The RF signal inputted to the active filter 4 is subject to band limitation according to the above-mentioned adjusted frequency characteristic, and a filtered RF signal is outputted to the demodulator 6. A power source control signal S7 generated by the ON/OFF timing generator circuit 35 of the baseband IC31 is inputted to the front-end circuit 2 and the demodulator 6 via the power source ON/OFF control terminal 7, and a power source control signal S8 generated by the ON/OFF timing generator circuit 35 of the baseband IC31 is inputted to the active filter circuit 4 via the power source ON/OFF control terminal 8. That is, the power source control signals S7 and S8 are individually inputted to the front-end circuit 2 and the demodulator 6, and to the active filter circuit 4, respectively, and the power source ON/OFF timing is separately controlled. In this case, the operation of the front-end circuit 2 and the demodulator 6 is started in response to a power source ON signal of the power source control signal S7 inputted via the power source ON/OFF control terminal 7. Furthermore, the frequency adjustment operation of the active filter circuit 3 is started in response to the power source ON signal of the power source control signal S8 inputted via the power source ON/OFF control terminal 8.

Figure 2:
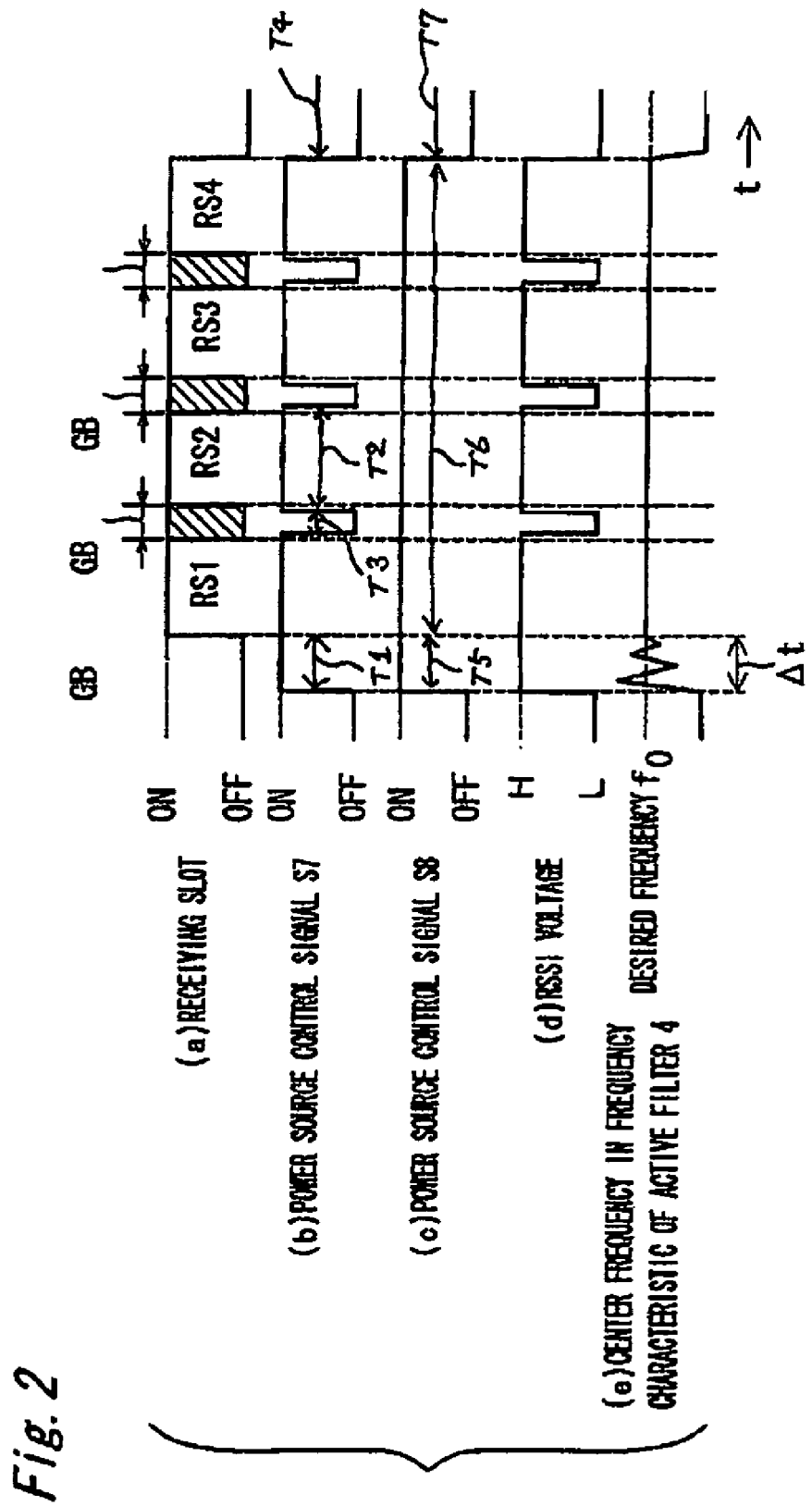
FIG. 2 is a timing chart showing a transient response operation when multi-slot receiving of the receiver circuit 30 shown in FIG. 1.

FIG. 2 is a timing chart showing a transient response operation when multi-slot receiving of the receiver circuit 30 shown in FIG. 1. The power source control signals S7 and S8 are individually inputted to the front-end circuit 2 and the demodulator 6, and to the active filter circuit 4, respectively, and a timing when the power source is turned ON/OFF is individually controlled. In this case, the power source ON signal of the power source control signals S7 and S8 are simultaneously inputted to the front-end circuit 2 and the demodulator 6, and to the active filter circuit 4 at the time of starting receiving, respectively, and therefore, the operation of 2, 4, and 6 are started at the same time. After that, only the power source control signal S7 is generated within a guard bit GB as a power source OFF signal between receiving slots. Then, both the power source control signals S7 and S8 are turned OFF at the time of completing receiving of the receiving slot. As described above, it is configured so that only the power source control signal S7 is turned OFF within the guard bit GB between the receiving slots, and the power source control signal S8 is not turned OFF within the guard bit GB. Then, this leads to that the center frequency in frequency characteristic of the active filter 4 is converged and set to a desired frequency $f_o$ before a first receiving slot, and then, the center frequency can be maintained over a predetermined number of the receiving slots. Therefore, the frequency characteristic of the active filter 4 is not fluctuated and the multi-slot receiving can be made.

As described above, since it is configured so that any frequency adjustment operation is not performed between the slots by generating power source control timing so that power source ON/OFF operation in the active filter circuit 3 is not caused between the receiving slots, the receiving data can be correctly received at the next slot.

In the present preferred embodiments, it is described that two power source ON/OFF control terminals 7 and 8 are provided, however, the present invention is not limited to this, and a number of power source ON/OFF control terminals equal to or larger than three may be provided. For example, even the case where three power source ON/OFF control terminals are provided to individually control the front-end circuit 2, the active filter circuit 3, and the demodulator 6, the same action and advantageous effects can be obtained. Furthermore, although the front-end circuit 2 and the demodulator 6 are controlled by the power source control signal S7. However, the present invention is not limited to this, and the demodulator 6 may be controlled by at least the power source control signal S7.

Second Preferred Embodiment

Figure 3:
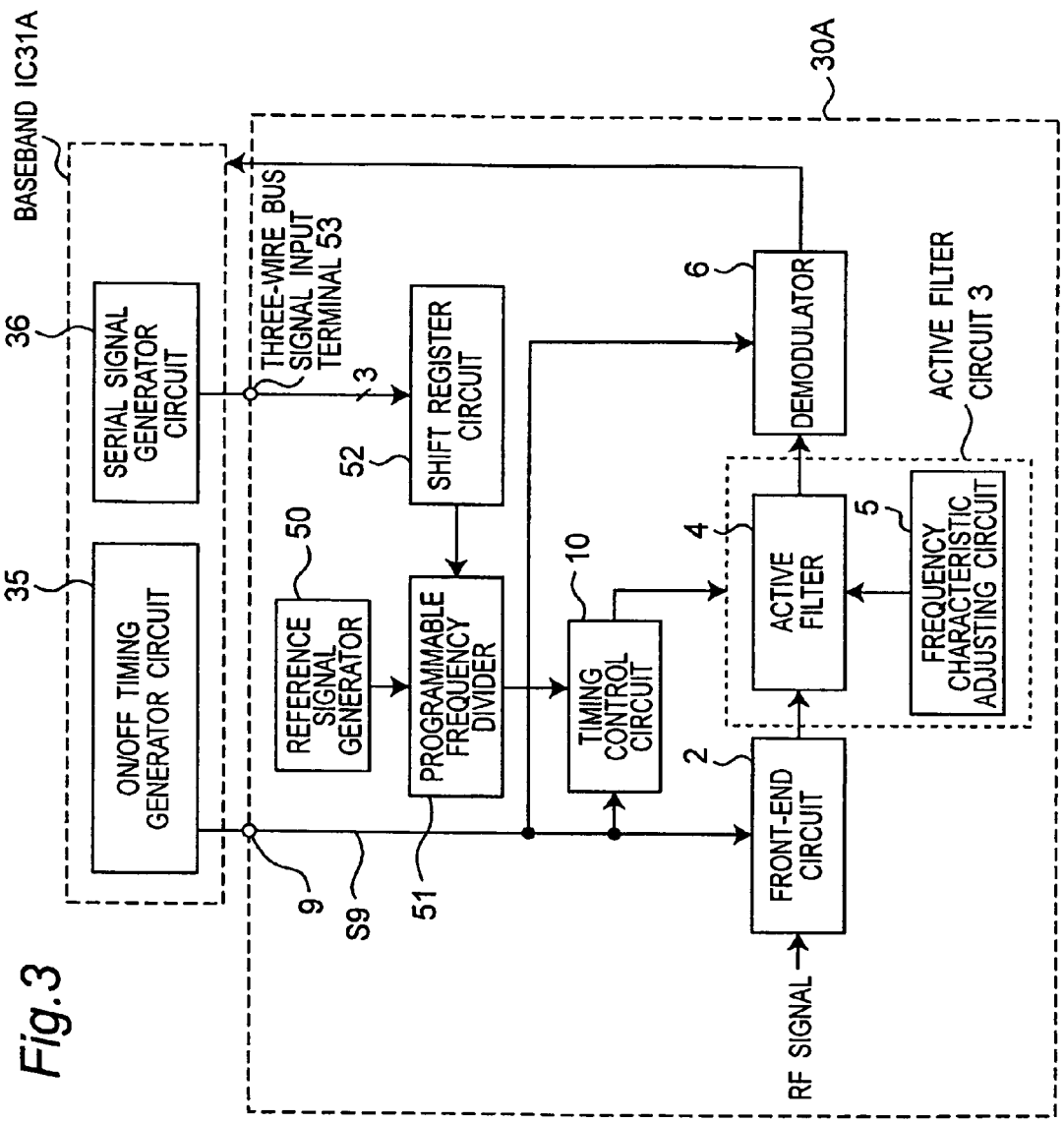
FIG. 3 is a block diagram showing a receiver circuit 30A according to a second preferred embodiment of the present invention.

FIG. 3 is a block diagram showing a receiver circuit 30A according to a second preferred embodiment of the present invention. The receiver circuit 30A according to the second preferred embodiment is different in the following points, as compared with the receiver circuit 30 shown in FIG. 1:

(a) A timing control circuit 10, a reference signal generator 50, a programmable frequency-divider 51, and a shift register circuit 52 are further provided.

(b) A power source ON/OFF control terminal 9 and a three-wire bus signal input terminal 53 are provided in place of the power source ON/OFF control terminals 7 and 8.

(c) A baseband IC31A including a ON/OFF timing generator circuit 36 and a serial signal generator circuit 36 are provided in place of the baseband IC31.

Referring to FIG. 3, a power source control signal S9 from the ON/OFF timing generator circuit 35 of the baseband IC31A is inputted to a front-end circuit 2, the timing control circuit 10, and a demodulator 6 via the power source ON/OFF control terminal 9. Furthermore, a serial data signal showing the frequency-divided number from the serial signal generator circuit 36 of the baseband IC31 is inputted to the shift register circuit 52 via the three-wire bus signal input terminal 53 together with a clock signal and an enable signal, and the shift register circuit 52 converts the serial data signal showing an inputted frequency-divided number, into a parallel data signal, and then, outputs the same serial data signal to the programmable frequency-divider 51. The reference signal generator 50 and the programmable frequency-divider 51 constitute a circuit which generates a delay time Δt1 (See FIG. 4) to be described later in the timing control circuit 10. That is, the reference signal generator 50 generates a reference signal having a predetermined reference frequency, and outputs the same reference signal to the programmable frequency-divider 51. The programmable frequency-divider 51 divides the frequency of the inputted reference signal on the basis of the frequency-divided number shown by the shift register circuit 52, and then, outputs a frequency-divided reference signal to the timing control circuit 10. In this case, the time interval of the high level of the frequency-divided reference signal corresponds to the delay time Δt. When the inputted power source control signal S9 falls, and then, only the delay time Δt1 has elapsed, the timing control circuit 10 falls the control signal from the timing control circuit 10 from the high level to the low level when the power source control signal has the low level. That is, the timing control circuit 10 is one which controls the power source OFF timing of an active filter circuit 3, and the timing control circuit 10 is configured so that the power source ON signal of the power source control signal S9 is directly outputted, and only the power source OFF signal is outputted after a lapse of a constant delay time Δt1. In this case, the delay time Δt1 of power source OFF signal of the power source control signal S9 is set so as to be longer than the time interval from a timing when applying the power source OFF signal of the power source control signal S9 to the power source ON/OFF control terminal 9 between the receiving slots to a timing when applying the power source ON signal of the power source control signal S9 for the next slot.

Figure 4:
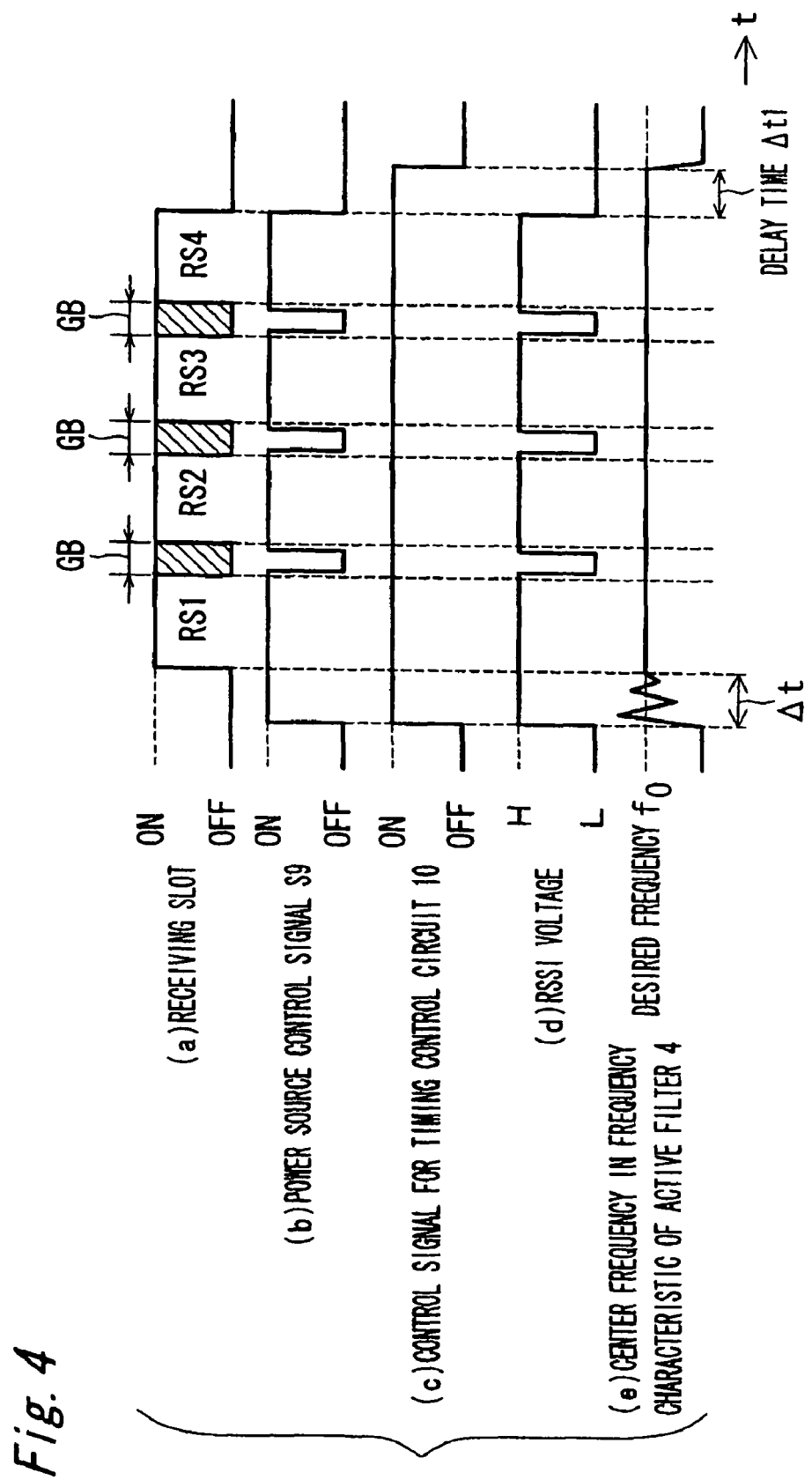
FIG. 4 is a timing chart showing a transient response operation at a time of multi-slot receiving of the receiver circuit 30A shown in FIG. 3.

FIG. 4 is a timing chart showing a transient response operation at a time of multi-slot receiving of the receiver circuit 30A shown in FIG. 3.

Referring to FIG. 4, when the power source control signal S9 inputted via the power source ON/OFF control terminal 9 between the receiving slots becomes the power source OFF signal, the power source of the front-end circuit 2 and the demodulator 6 is turned OFF and the RSSI voltage falls to the low level. However, since the timing control circuit 10 for controlling the power source OFF timing of the active filter circuit 3 outputs the power source OFF signal of the power source control signal S9 after waiting for the delay time Δt1, the active filter circuit 3 is not turned OFF without any lapse of the delay time Δt1. In this case, when the power source control signal S9 becomes the power source ON signal earlier than the delay time Δt1, the timing control circuit 10 outputs the power source ON signal of the power source control signal S9 at the same timing. Therefore, the power source ON signal is outputted without outputting any power source OFF signal. Accordingly, the active filter circuit 3 is not turned OFF between the receiving slots, is always maintained turned ON, and consequently, any frequency adjustment operation is not performed. The power source control signal S9 becomes the power source OFF signal at the time of completing receiving operation, and the output signal from the timing control circuit 10 becomes the low level after the delay time Δt1 and the active filter circuit 3 is turned OFF.

According to the receiver circuit 30A according to the above configured present preferred embodiment, the power source control timing can be generated so that power source ON/OFF operation of the active filter circuit 3 is not caused between the receiving slots, and any frequency adjustment operation is not performed between the receiving slots, and this leads to that the data of the next slot can be correctly received.

Third Preferred Embodiment

Figure 5:
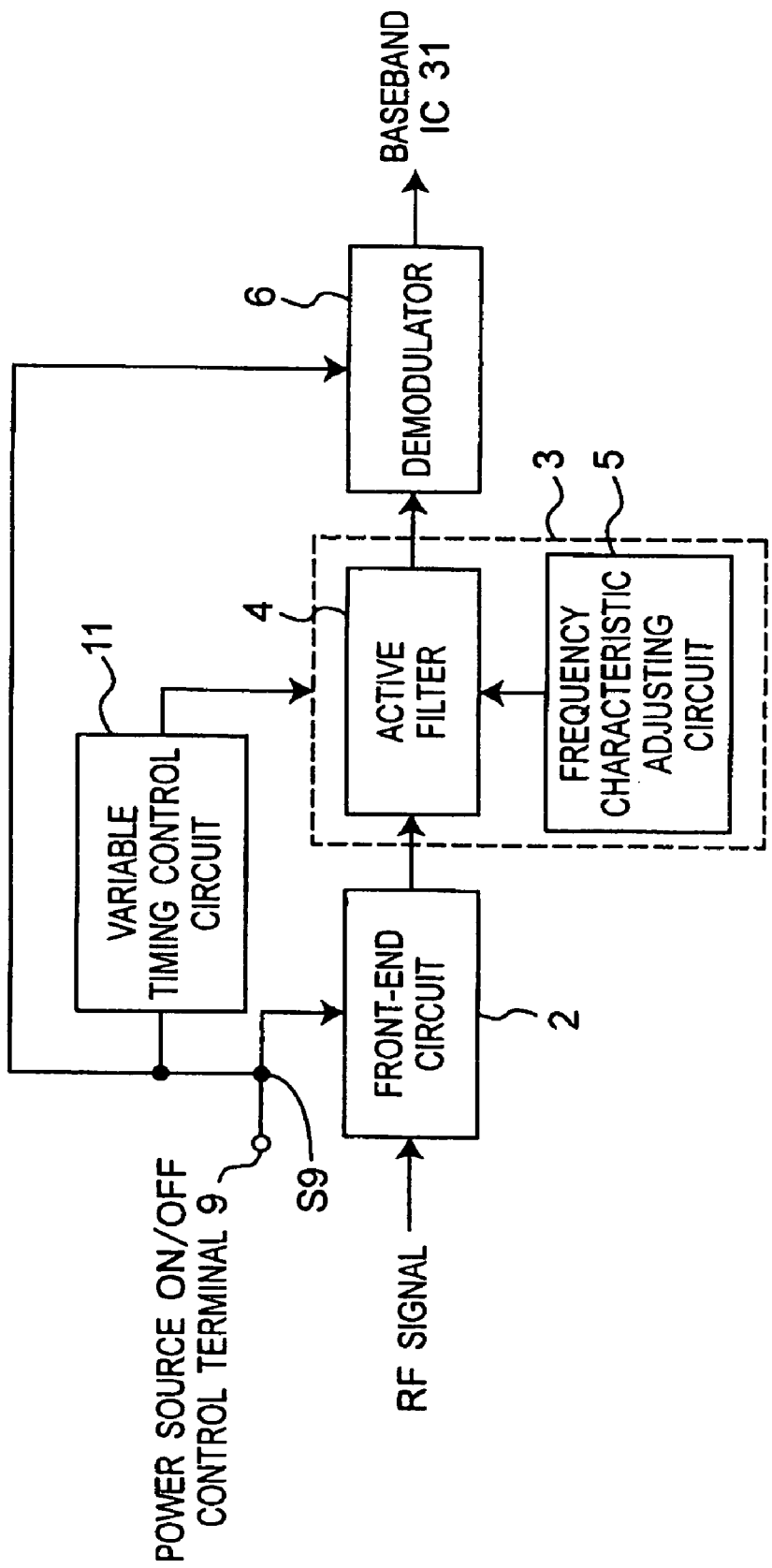
FIG. 5 is a block diagram showing a receiver circuit 30B according to a third preferred embodiment of the present invention.

FIG. 5 is a block diagram showing a receiver circuit 30B according to a third preferred embodiment of the present invention. The receiver circuit 30B according to the third preferred embodiment is characterized by further including a variable timing control circuit 11 in place of the timing control circuit 10, as compared with the receiver circuit 30A shown in FIG. 3. In this case, the reference signal generator 50, the programmable frequency-divider 51, the shift register circuit 52, and the three-wire bus signal input terminal 53 shown in FIG. 3 are not provided.

Referring to FIG. 5, the variable timing control circuit 11 controls the power source OFF timing of the active filter circuit 3 on the basis of a power source control signal S9 inputted via the power source ON/OFF control terminal 9. More concretely, the variable timing control circuit 11 is configured so as to change a delay time so that the power source ON signal of the power source control signal S9 is directly outputted and only the power source OFF signal is outputted after a lapse of an arbitrary delay time Δt1.

According to the receiver circuit 30B according to the above configured present preferred embodiment, in the receiver circuit mixing a plurality of communication systems, even when the time of the guard bit GB between receiving slots is different from that of the other systems, the delay time of the power source OFF signal of the power source control signal S9 may be changed depending on the communication system, and this leads to that the power source control timing can be generated so that the power source ON/OFF operation of the active filter circuit 3 is not caused between the receiving slots, and any frequency adjustment operation is not performed between the receiving slots, and this leads to that the data of the next slot can be correctly received.

Fourth Preferred Embodiment

Figure 6:
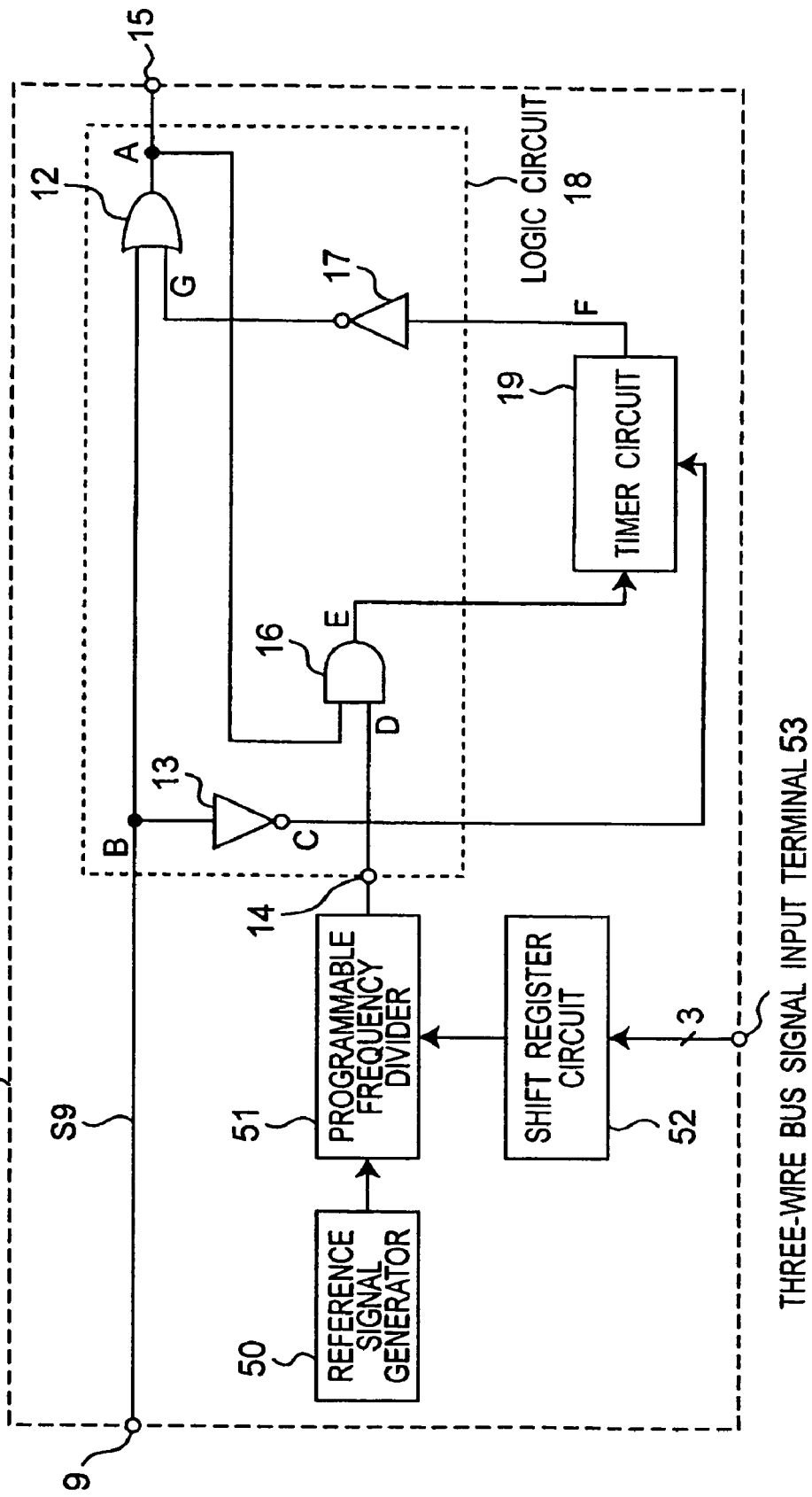
FIG. 6 is a block diagram showing a configuration of a variable timing control circuit 11A according to a fourth preferred embodiment of the present invention.

FIG. 6 is a block diagram showing a configuration of a variable timing control circuit 11A according to a fourth preferred embodiment of the present invention. The variable timing control circuit 11A according to the preferred embodiment is a concrete example of the variable timing control circuit 11 shown in FIG. 5. Referring to FIG. 6, the variable timing control circuit 11A is constituted by including the power source ON/OFF control terminal 9, an output terminal 15, a logic circuit 18, a timer circuit 19, a reference signal generator 50, a programmable frequency-divider 51, a shift register circuit 52, and a three-wire bus signal input terminal 53. In this case, the logic circuit 18 is constituted by including a reference signal input terminal 14, two inverters 13 and 17, an AND gate 16, and an OR gate 12.

A power source control signal B (S9) inputted via the power source ON/OFF control terminal 9 is inputted to a first input terminal of the OR gate 12, and is also inputted to a reset terminal of the timer circuit 19 via the inverter 13 as an inverted power source control signal C. The operations among the reference signal generator 50, the programmable frequency-divider 51, the shift register circuit 52, and the three-wire bus signal input terminal 53 are the same as those shown in FIG. 3. A frequency-divided reference signal D outputted from the programmable frequency-divider 51 is inputted to a second input terminal of the AND gate 16 via the reference signal input terminal 14. A power source control signal A outputted from the OR gate 12 is outputted to the output terminal 15, and is also outputted to a first input terminal of the AND gate 16. A signal E outputted from the AND gate 16 is outputted to a timer circuit 19. The timer circuit 19 starts in response to the reset operation thereof on the basis of an inverted power source control signal C from the inverter 13, and is made up of a counter circuit which counts the number of pulses of the signal E outputted from the AND gate 16. In this case, the timer circuit 19 outputs an output signal F therefrom to a second input terminal of the OR gate 12 via the inverter 17 as an inverted output signal G. When the number of pulses of the signal E exceeds a predetermined value, the timer circuit 19 outputs the output signal F therefrom by rising from the low level to the high level. In addition, when the power source control signal S9 has the high level, it becomes the power source ON signal. On the other hand, when the power source control signal S9 has the low level, it becomes the power source OFF signal. The timer circuit 19 is reset when the output signal C from the inverter 13 has the low level.

According to the thus configured variable timing control circuit 11A, there can be realized the timing control circuit in which the power source ON signal of the power source control signal S9 is outputted at the same timing and only the power source OFF signal is outputted by giving a constant delay time by the timer circuit 19.

Figure 7:
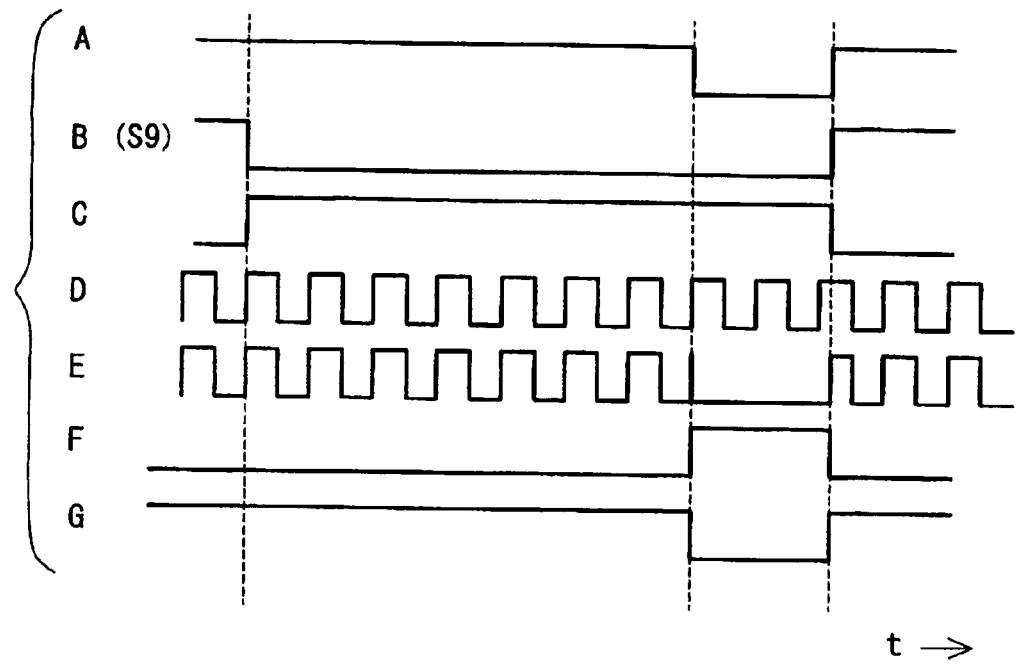
FIG. 7 is a timing chart showing an operation when a power source ON timing of a control signal inputted via a power source ON/OFF control terminal 9 is kept as it is and only a power source OFF timing is delayed for a constant time, in the variable timing control circuit 11A shown in FIG. 6.

FIG. 7 is a timing chart showing an operation when the power source ON timing of the control signal inputted via the power source ON/OFF control terminal 9 is kept as it is and only the power source OFF timing is delayed for a constant time, in a variable timing control circuit 11A shown in FIG. 6.

Referring to FIG. 7, since the power source control signal B (S9) has the high level in an initial state, the output signal A from the OR gate 12 becomes the high level. At this time, the power source control signal B is inverted by the inverter 13, and then, the low level signal is applied to the timer circuit 19 as the reset signal C of the timer circuit 19. The output signal E from the AND gate 16 which is logical multiplication of the output signal A, and then, the frequency-divided reference signal D is inputted to an input terminal of the timer circuit 19. However, when the reset signal C has the low level, the timer circuit 19 performs reset operation, and the output signal F from the timer circuit 19 becomes the low level. After the output signal F from the timer circuit 19 is inputted to the inverter 17, the output signal G from the inverter 17 is inputted to the OR gate 12.

Next, when the power source control signal B (S9) falls to the low level, since the output signal G from the inverter 17 has the high level, the output signal A from the OR gate 12 is maintained to have the high level. The output signal B is inverted by the inverter 13, and the reset signal C of the timer circuit 19 becomes the high level. This leads to that the reset signal for the timer circuit 19 is released, and then, the timer circuit 19 starts timer operation to count the number of pulses of the output signal E from the AND gate 16. In this case, the timer circuit 19 is configured such as a three-bit counter, the high level signal is outputted when eight pulses of the output signal E are inputted. When the timer circuit 19 receives an eighth pulse of the output signal E from the AND gate 16, the output signal F therefrom becomes the high level, and the output signal G from the inverter 17 becomes the low level. When the output signal G from the inverter 17 becomes the low level, the output signal A from the OR gate 12 which is logical sum of the power source control signal B (S9), and the output signal G from the inverter 17 falls to the low level. When the output signal A falls to the low level, the output signal E from the AND gate 16 falls to the low level, and then, any pulse of inverted power source control signal C is not inputted to the timer circuit 19, and consequently, the output signal F from the timer circuit 19 is maintained to have the high level.

Next, when the power source control signal B (S9) becomes the high level again, the output signal A from the OR gate 12 becomes the high level. At the same time, after the power source control signal B is inverted by the inverter 13, the low level signal is applied to the timer circuit 19 as the reset signal C of the timer circuit 19. Since the timer circuit 19 performs reset operation on the basis of the low level reset signal C, the output signal F becomes the low level.

The above described operation can realize the timing control circuit in which the power source ON timing of the power source control signal B inputted via the power source ON/OFF control terminal 9 is kept as it is and only power source OFF operation is outputted after a lapse of a constant time.

Figure 8:
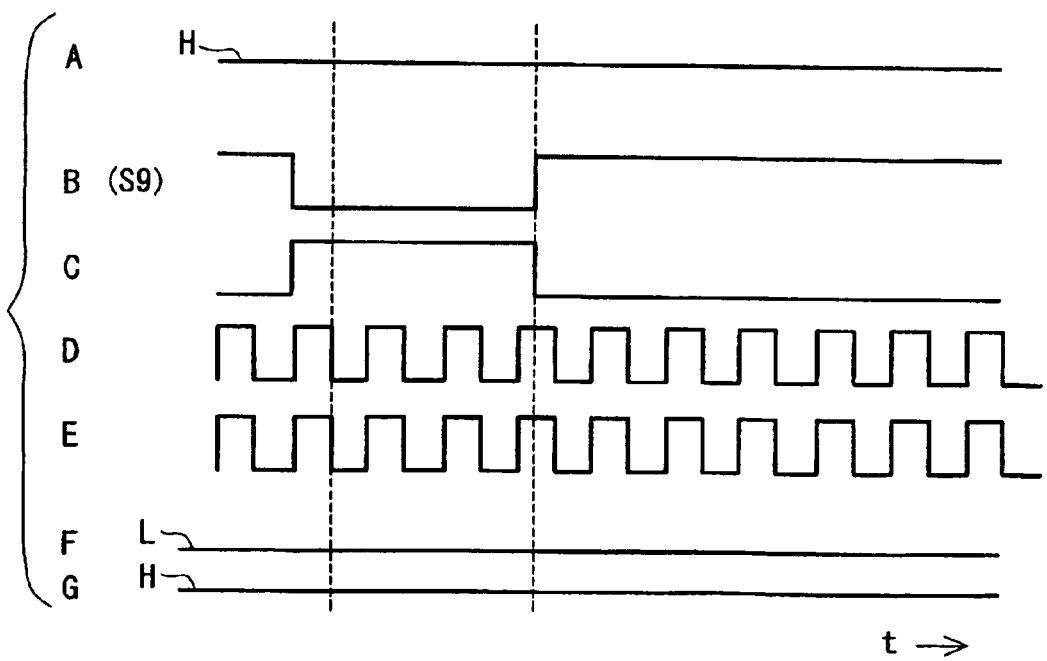
FIG. 8 is a timing chart showing an operation when the control signal inputted from the power source ON/OFF control terminal 9 is turned OFF and is turned ON again, in the variable timing control circuit 11A shown in FIG. 6.

FIG. 8 is a timing chart showing an operation when the control signal inputted from the power source ON/OFF control terminal 9 is turned OFF and is turned ON again, in the variable timing control circuit 11A shown in FIG. 6.

Referring to FIG. 8, such a state that the power source control signal B (S9) falls from the high level to the low level is the same as that of FIG. 7. Since the output signal G from the inverter 17 has the high level, the output signal A from the OR gate 12 is maintained to have the high level. The timer circuit 19 starts to count the number of pulses of the output signal E from the AND gate 16 from the timing of the power source OFF signal of the power source control signal B (S9). Since the delay time of the timer circuit 19 is set to be longer than the time interval from a timing when the power source is turned OFF to a timing when the power source is turned ON again between the receiving slots, the power source control signal B (S9) becomes the high level again before completing counting the number of pulses of the output signal E from the AND gate 16 between the receiving slots. As a result, the output signal A from the OR gate 12 is maintained to have the high level, at the same time, the output signal F is inverted by the inverter 13, and the low level signal is applied to the timer circuit 19 as a reset signal C of the timer circuit 19. Since the timer circuit 19 performs reset operation by the low level reset signal C, the counter operation is stopped, and the output signal F is maintained to have the low level.

The above-mentioned operation can realize the timing control circuit which does not perform any power source ON/OFF operation of the active filter circuit 3 between the receiving slots even the power source control signal B (S9) performs power source ON/OFF operation control.

In the present preferred embodiment, although it describes that the timer circuit 19 is assumed to be the three-bit counter that counts reference input. However, the present invention is not limited to this, and it may be a timer circuit which is capable of obtaining a delay time required for the system. The timer circuit 19 may be a timer circuit which, for example, in the case of a PHS system, counts a longer time than 41.7 μsec of a guard bit GB. Furthermore, the programmable frequency-divider 51 is used, to enable to arbitrarily set a count time corresponding to a serial data signal, which shows the frequency-divided number inputted via the three-wire bus signal input terminal 53, and this leads to realization of a timing control circuit which is capable of dealing with a plurality of communication systems. Further, the logic circuit 18, which includes the two inverters 13 and 17, the AND gate 16, and the OR gate 12, is described, however, the polarity can be changed by a method which further adds an inverter and the like, and the same action and effects can be obtained if it is a logic circuit in which the timing of the power source ON signal of the power source control signal B (S9) is kept as it is and only the power source OFF signal is outputted by delaying only a predetermined delay time which is set by the timer circuit 19.

Fifth Preferred Embodiment

Figure 9:
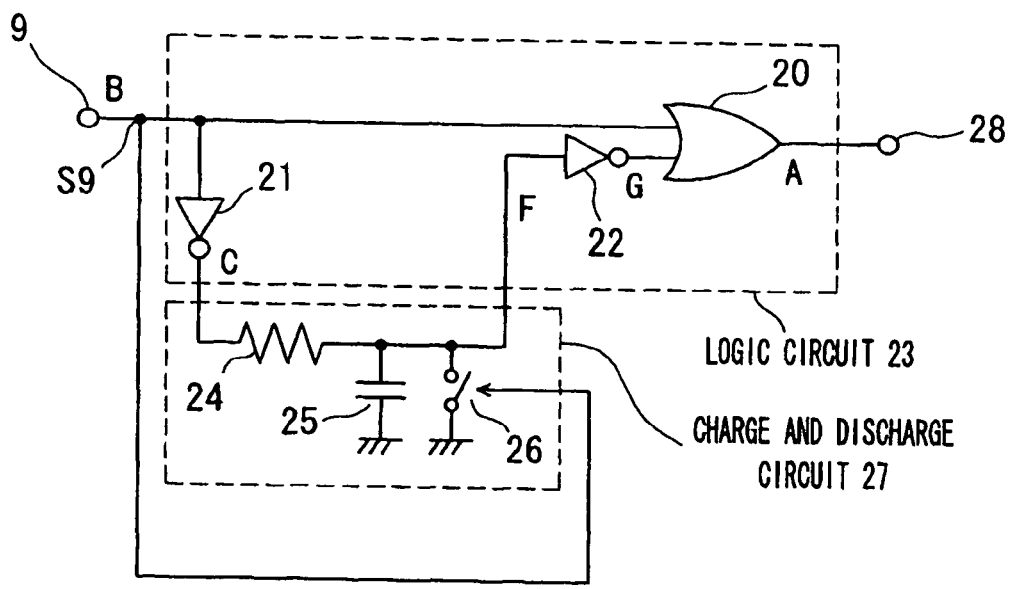
FIG. 9 is a block diagram showing a configuration of a variable timing control circuit 11B according to a fifth preferred embodiment of the present invention.

FIG. 9 is a block diagram showing a configuration of a variable timing control circuit 11B according to a fifth preferred embodiment of the present invention. A variable timing control circuit 11B according to the fifth preferred embodiment is constituted by including a logic circuit 23 and a charge and discharge circuit 27 in place of the configuration including the logic circuit 18 and the timer circuit 19 shown in FIG. 6. In this case, the logic circuit 23 is constituted by including two inverters 21 and 22 and an OR gate 20. In addition, the charge and discharge circuit 27 is constituted by including a resistor 24, a capacitor 25, and a switch 26, and corresponds to the timer circuit 19 shown in FIG. 6.

Referring to FIG. 9, a power source control signal B (S9) inputted via the power source ON/OFF control terminal 9 is outputted to a first input terminal of the OR gate 20, and is also outputted to the OR gate 20 via the inverter 21, the resistor 24, and the inverter 22. In addition, the power source control signal B (S9) is used as a control signal for the switch 26, as described in detail later. Further, another end on the inverter 22 side of the resistor 24 is grounded via the capacitor 25 and also grounded via the switch 26. The OR gate 20 outputs a signal having a level of logical sum of the power source control signal B (S9) and an output signal G from the inverter 22 as an output signal. The switch 26 is controlled to be a short-circuit state (or an ON state) when the power source control signal B (S9) is the power source ON signal, and is controlled to be an open-circuit state (or an OFF state) when the power source control signal B (S9) is the power source OFF signal.

According to the thus configured variable timing control circuit 11B, there can be realized the timing control circuit in which the power source ON signal of the power source control signal B (S9) is outputted at the same timing and only the power source OFF signal is outputted by giving a constant delay time by the timer circuit 27. That is, the charge and discharge circuit 27 operates as the timer circuit 19.

Figure 10:
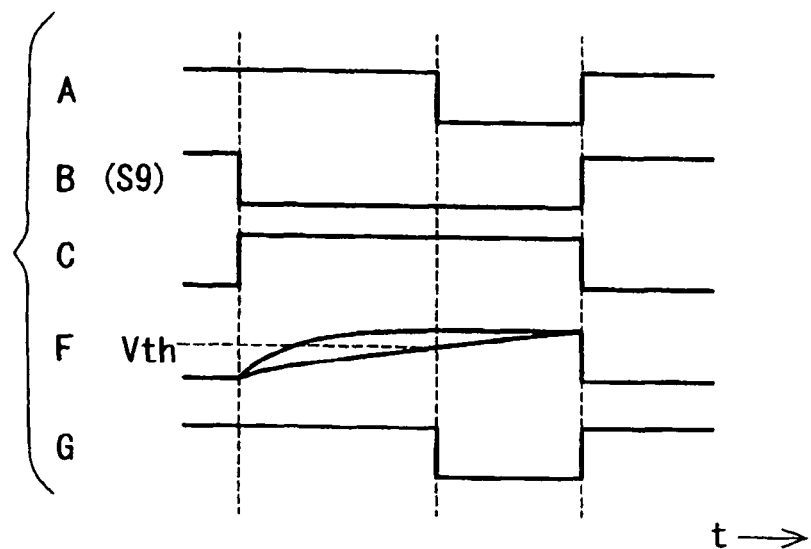
FIG. 10 is a timing chart showing an operation when a power source ON timing of a control signal inputted via a power source ON/OFF control terminal 9 is kept as it is and only a power source OFF timing is delayed for a constant time, in a variable timing control circuit 11B shown in FIG. 9.

FIG. 10 is a timing chart showing an operation when the power source ON timing of a control signal inputted via the power source ON/OFF control terminal 9 is kept as it is and only the power source OFF timing is delayed for a constant time, in the variable timing control circuit 11B shown in FIG. 9.

Referring to FIG. 10, since the power source control signal B (S9) has the high level in an initial state, an output signal A from the OR gate 20 becomes the high level. At this time, the power source control signal B (S9) is inverted by the inverter 21, and the inversion signal C becomes the low level. It is configured such that the switch 26 is turned ON when the power source control signal B (S9) is the power source ON signal, and then, an output signal F from the charge and discharge circuit 27 becomes the low level, and an inverted output signal G after the output signal F therefrom passes the inverter 22 becomes the high level.

Next, the power source control signal B (S9) falls to the low level, However, since the inverted output signal G from the inverter 22 has the high level, the output signal A from the OR gate 20 is maintained to have the high level. The power source control signal B (S9) is inverted by the inverter 21 and the inverted power source control signal C becomes the high level. At the same time, the switch 26 is turned OFF, and this leads to that the capacitor 25 starts to charge and the output signal F from the charge and discharge circuit 27 gradually rises with a time constant of the charge and discharge circuit 27 and becomes the high level. Further, since the output signal F from the charge and discharge circuit 27 is inverted by the inverter 22, the inverted output signal G gradually falls with a time constant of the charge and discharge circuit 27 and becomes the low level. Then, when the inverted output signal G reaches a threshold voltage Vth of the OR gate 20, the output signal A from the OR gate 20 becomes the low level.

Next, when the power source control signal B (S9) becomes the high level again, the output signal A from the OR gate 20 becomes the high level. At the same time, the switch 26 is turned ON, the capacitor 25 is rapidly discharged, and the output signal from the charge and discharge circuit 27 falls to the low level.

The above described operation can realize the timing control circuit in which the power source ON timing of the power source control signal B (S9) inputted via the power source ON/OFF control terminal 9 is kept as it is and only power source OFF operation is outputted after a lapse of a constant time.

Figure 11:
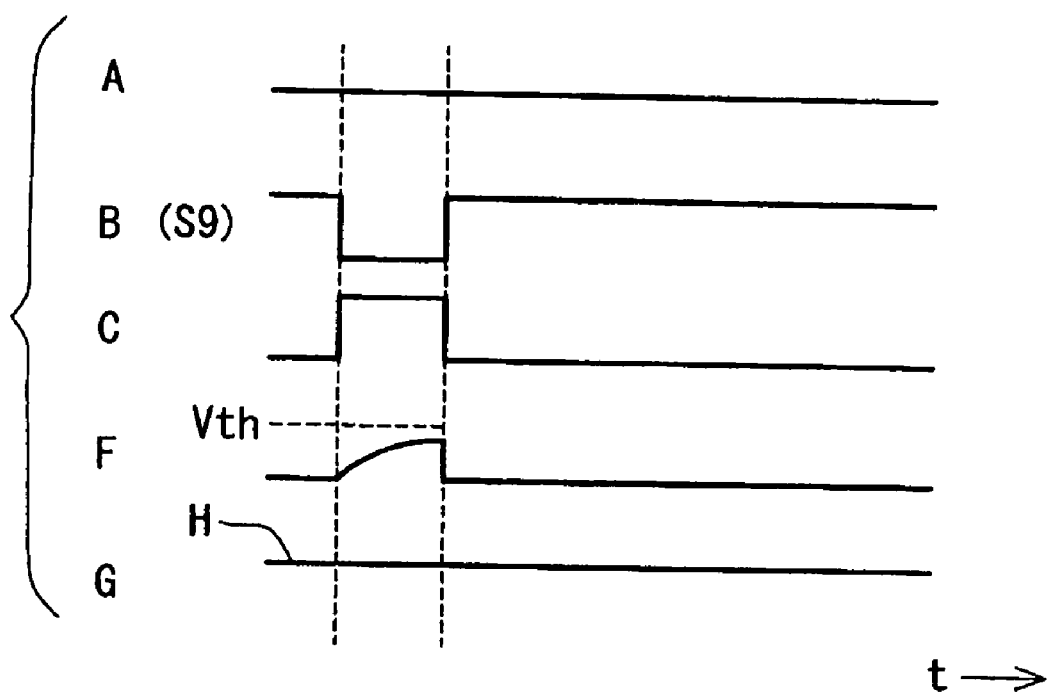
FIG. 11 is a timing chart showing an operation when the control signal inputted from the power source ON/OFF control terminal 9 is turned OFF and turned ON again, in the variable timing control circuit 11B shown in FIG. 9.

FIG. 11 is a timing chart showing an operation when the control signal inputted from the power source ON/OFF control terminal 9 is turned OFF and turned ON again, in the variable timing control circuit 11B shown in FIG. 9.

Referring to FIG. 11, such a state that the power source control signal B (S9) falls from the high level to the low level is the same as that of FIG. 10. Since the output signal G from the inverter 22 has the high level, the output signal A from the OR gate 20 is maintained to have the high level. The charge and discharge circuit 27 starts charging from the timing of the power source OFF signal of the power source control signal B (S9), the output signal D from the charge and discharge circuit 27 gradually rises with a time constant of the charge and discharge circuit 27 and becomes the high level, and the inversion signal G of the output signal F gradually falls with a time constant of the charge and discharge circuit 27 and becomes the low level. Since the time constant of the charge and discharge circuit 27 is set to be longer than the time interval from a timing when the power source is turned OFF to a timing when the power source is turned ON again between the receiving slots, the power source control signal B (S9) becomes the high level again before the inverted output signal G reaches a threshold voltage Vth of the OR gate 20 between the receiving slots. As a result, the output signal A from the OR gate 20 is maintained to have the high level, at the same time, the switch 26 is turned ON, and the electric charge of the capacitor 15 of the charge and discharge circuit 27 is rapidly discharged.

The above-mentioned operation can realize the timing control circuit which does not perform power source ON/OFF operation of the active filter circuit 3 between the receiving slots even power source ON/OFF operation is performed on the basis of the power source control signal B (S9) 9.

In the present preferred embodiment, the charge and discharge circuit 27 is realized by an integrating circuit using the resistor 24, the capacitor 25, and the switch 26, and the time constant in this case can be obtained by multiplying the resistance value and the capacitance value. However, the present invention is not limited to this, and it may be configured by a charge and discharge circuit having a time constant, not limited to an integrating circuit. Furthermore, a plurality of capacitors having capacitance values different from each other is provided so as to switch over among a plurality of time constants by such a method that one of the plurality of capacitors is selected by a switch and the like, and this leads to that there can be realized the timing control circuit which is capable of dealing with a plurality of communication systems. In addition, the logic circuit 23 is constituted by including the two inverters 21 and 22 and the OR gate 20, however, the present invention is not limited to this, and it may change the polarity by such a method that the inverter is further added in the logic circuit 23 and the like, and there may be configured a logic circuit in which the timing of the power source ON signal of the power source control signal B (S9) is kept as it is and only the power source OFF signal is outputted by delaying only the time which is set by the charge and discharge circuit 27.

Sixth Preferred Embodiment

Figure 12:
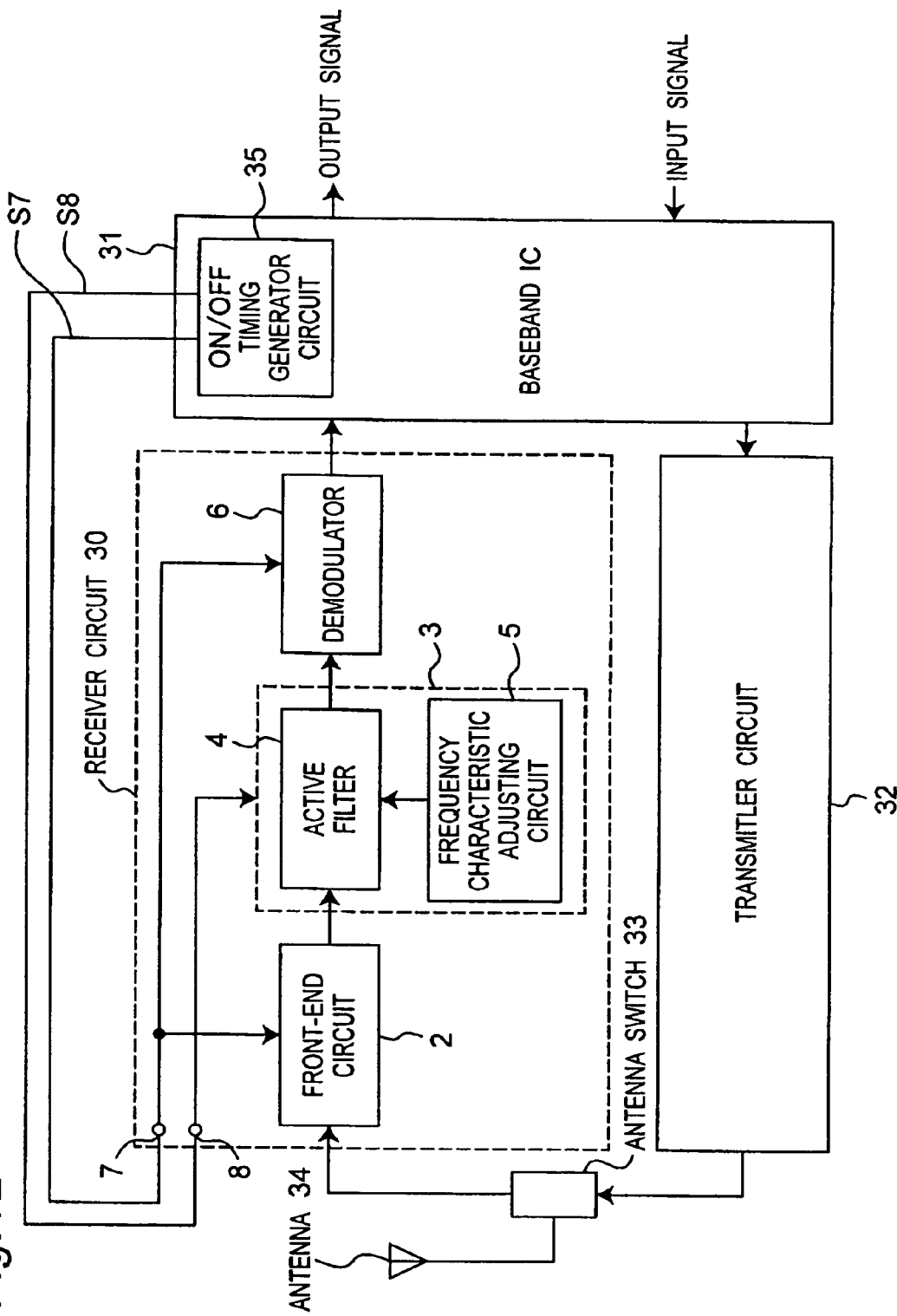
FIG. 12 is a block diagram showing a configuration of a radio communication apparatus according to a sixth preferred embodiment of the present invention.
Figure 13:
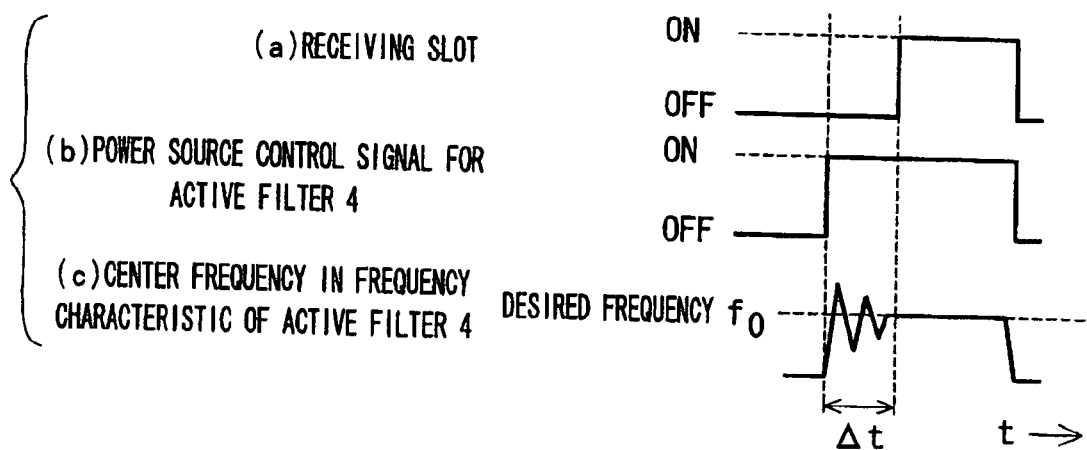
FIG. 13 is a timing chart showing an operation at the time of power source ON of an active filter incorporated in an IC, in a receiver circuit related a prior art.
Figure 14:
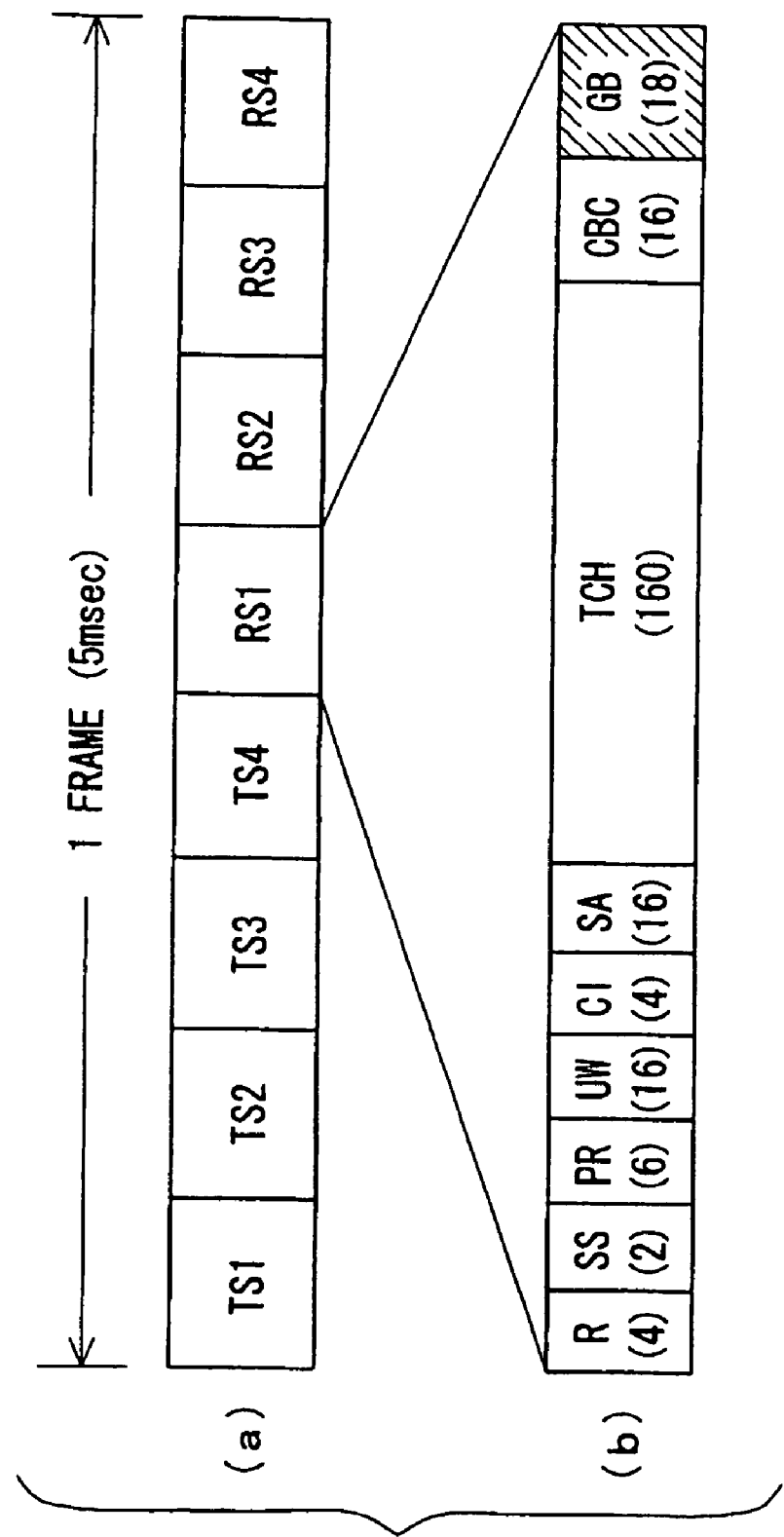
FIG. 14 is a schematic diagram showing an up frame configuration and a detail frame configuration of one receiving slot, in a PHS system according to a prior art.
Figure 15:
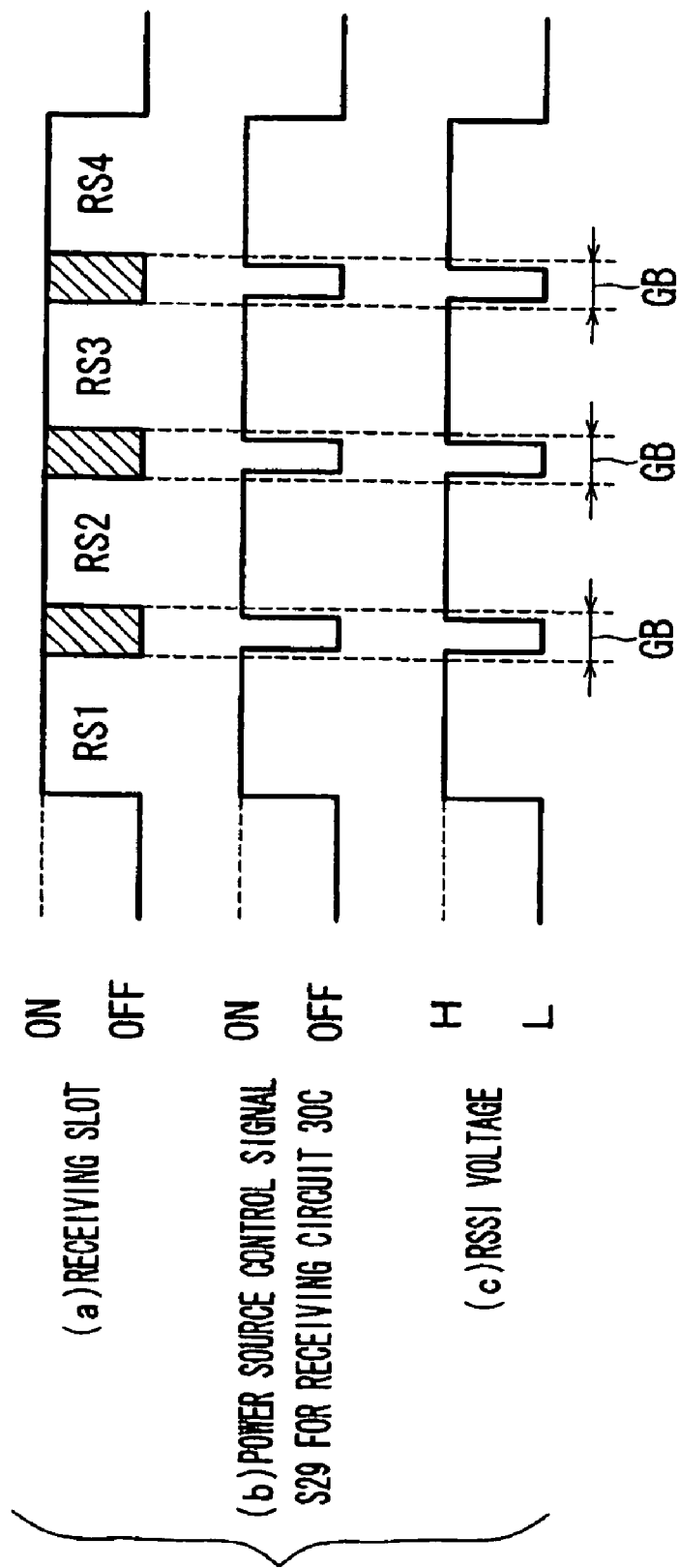
FIG. 15 is a timing chart showing a relationship among a receiving slot, a power source control signal for a receiver circuit, and an RSSI voltage in a receiver circuit for the PHS system according to the prior art.

FIG. 12 is a block diagram showing a configuration of a radio communication apparatus according to a sixth preferred embodiment of the present invention. Referring to FIG. 12, a radio communication apparatus according to the present preferred embodiment is constituted by including an antenna 34, an antenna switch 33, a receiver circuit 30, a transmitter circuit 32, and a baseband IC 31. In this case, the receiver circuit 30 is constituted by including a front-end circuit 2, an active filter circuit 3, and a demodulator 6. In addition, the receiver circuit 20 is not limited to the receiver circuit 30 shown in FIG. 1, however, it may be the receiver circuit 30A shown in FIG. 3 or the receiver circuit 30B shown in FIG. 5.

Referring to FIG. 12, upon receiving, the antenna switch 33 is switched over so that the antenna 34 is connected to the receiver circuit 30, whereas when transmitting, the antenna switch 33 is switched over so that the antenna 34 is connected to the transmitter circuit 32. Upon receiving, an RF signal received by the antenna 34 is inputted to the receiver circuit 30 via the antenna switch 34, and the receiver circuit 30 performs processings such as low-noise amplification, frequency conversion, and demodulation on the inputted RF signal, and then, outputs a demodulated baseband signal to the baseband IC 31. The baseband IC 31 executes a predetermined baseband processing on the inputted baseband signal and outputs processed audio and data as output signals. On the other hand, upon transmitting, the baseband IC 31 executes a baseband processing on input signals such as audio and data, and then, outputs the processed baseband signal to the transmitter circuit 32. The transmitter circuit 32 executes processings such as modulation and power amplification on the inputted baseband signal, and then, transmits the processed RF signal from the antenna 34 via the antenna switch 33. In addition, the ON/OFF timing generator circuit 35 of the baseband IC 35 generates, for example, power source control signals S7 and S8 shown in FIG. 2, and outputs the same signals to the receiver circuit 20 via the power source ON/OFF control terminals 7 and 8, respectively. The power source control signal S7 is inputted to the front-end circuit 2 and the demodulator 6 in a manner similar to that of FIG. 1, and the power source control signal S8 is inputted to the active filter circuit 3 in a manner similar to that of FIG. 1.

As described above, the radio communication apparatus is configured by using any of receiver circuits 30, 30A, and 30C described in the first preferred embodiment to the fifth preferred embodiment, and this leads to that a radio communication apparatus, which performs multi-slot receiving that is realized using a receiver circuit which uses an existing passive filter, and can be realized using the receiver circuit which uses the active filter advantageous for circuit integration (or reduction in size).

In the present preferred embodiment, there is described an example of the radio communication apparatus as configured by using the antenna 34, the antenna switch 33, the transmitter circuit 32, the baseband IC 31, and any of the receiver circuits 30, 30A, and 30B described in the first preferred embodiment to the fifth preferred embodiment. However, the present invention is not limited to this, and the present invention may be applied to a radio communication apparatus configured by using any of the receiver circuits 30, 30A, and 30B described in the first preferred embodiment to the fifth preferred embodiment. For example, the present invention may be applied to a radio communication apparatus which performs only receiving by deleting the transmitter circuit 32 from the configuration shown in FIG. 12. Further, in the above described preferred embodiments, there is described the radio communication apparatus which transmits and receives transmission signals by radio. However, the present invention is not limited to this, and it is widely applicable to a wired communication apparatus which transmits and receives transmission signals by wire or a communication apparatus.

INDUSTRIAL APPLICABILITY

As described above, according to the receiver circuit according to the present invention, there is provided the control device which controls the power source of the receiving device using the first power source control signal, and also controls the power source of the active filter circuit using the second power source control signal. More concretely, the control device controls the power source of the receiving device using the first power source control signal. When the data of a plurality of receiving slots having a guard bit provided between receiving slots adjacent to each other is received, the first power source control signal becomes the power source ON signal before starting receiving of the data, becomes the power source ON signal after temporarily becoming the power source OFF signal within the guard bit, and becomes the power source OFF signal after completing receiving of the data. The control device further controls the power source of the active filter circuit using the second power source control signal, which becomes the power source OFF signal after completing the receiving of the data after becoming the power source ON signal before starting the receiving of the data. Therefore, there can be realized the receiver circuit which can maintain the frequency characteristic of the active filter between the receiving slots. This enables the multi-slot receiving in the receiver circuit that uses the active filter which is advantageous for circuit integration or reduction in size.

As described above, although the present invention has been described in detail by the preferred embodiments, the present invention is not limited to this, however, it will become apparent to a person skilled in the art that many preferred modified and amended embodiments can be made in the technical scope of the present invention described in the scope of the appended claims.

What is claimed is:

1. A receiver circuit comprising:
   an active filter circuit including an active filter which filters an inputted transmission signal using a predetermined frequency characteristic, and an adjusting circuit which adjusts the frequency characteristics of said active filter;
   a receiving device including a demodulator which demodulates the filtered transmission signal; and
   a control device which controls a power source of said receiving device using a first power source control signal, and controls a power source of said active filter circuit using a second power source control signal,
   wherein said control device controls the power source of said receiving device using the first power source control signal, upon reception of data including a plurality of reception slots having a guard bit provided between reception slots adjacent to each other, the first power source control signal becoming a power source ON signal before starting of reception of the data, the first power source control signal becoming a power source ON signal after temporarily becoming a power source OFF signal within the guard bit, and the first power source control signal becoming a power source OFF signal after completing the reception of the data, and
   wherein said control device also controls the power source of said active filter circuit using the second power source control signal, the second power source control signal becoming a power source ON signal before starting of the reception of the data, and thereafter, maintaining the power source ON signal as an ON signal until the second power source control signal becomes a power source OFF signal after completing the reception of the data.

2. The receiver circuit as claimed in claim 1, wherein said control device generates and outputs the power source OFF signal of the second power source control signal after a lapse of a predetermined delay interval from the power source OFF signal of the first power source control signal on the basis of the inputted first power source control signal.

3. The receiver circuit as claimed in claim 1, wherein said control device comprises:
   a generator device which generates a reference signal having a predetermined reference frequency; and
   a frequency-dividing device which generates and outputs a frequency-divided signal showing a delay interval by dividing the frequency of the reference signal by a predetermined frequency-divided number.

4. The receiver circuit as claimed in claim 2, wherein said control device comprises:
   a generator device which generates a reference signal having a predetermined reference frequency; and
   a frequency-dividing device which generates and outputs a frequency-divided signal showing the delay interval by dividing the frequency of the reference signal by a predetermined frequency-divided number.

5. The receiver circuit as claimed in claim 1, wherein said control device is configured to be able to change a delay interval.

6. The receiver circuit as claimed in claim 3, wherein said control device is configured to be able to change the delay interval.

7. The receiver circuit as claimed in claim 1, wherein said control device comprises:
   a timer circuit which counts a time of a delay interval; and
   a logic circuit which generates and outputs the power source OFF signal of the second power source control signal after a lapse of a counted delay interval from the power source OFF signal of the first power source control signal.

8. The receiver circuit as claimed in claim 3, wherein said control device comprises:
   a timer circuit which counts a time of the delay interval; and
   a logic circuit for generating and outputting the power source OFF signal of the second power source control signal after a lapse of a counted delay interval from the power source OFF signal of the first power source control signal.

9. The receiver circuit as claimed in claim 7, wherein said timer circuit includes a counter circuit.

10. The receiver circuit as claimed in claim 8, wherein said timer circuit includes a counter circuit.

11. The receiver circuit as claimed in claim 7, wherein said timer circuit includes a charge and discharge circuit.

12. The receiver circuit as claimed in claim 8, wherein said timer circuit includes a charge and discharge circuit.

13. A transceiver circuit comprising:
    a transmitter circuit which transmits a transmission signal; and
    a receiver circuit which receives the transmission signal, wherein said receiver circuit comprises:
        an active filter circuit including an active filter which filters an inputted transmission signal using a predetermined frequency characteristic, and an adjusting circuit which adjusts the frequency characteristic of said active filter; and
        a receiving device including a demodulator which demodulates the filtered transmission signal,
    wherein said receiver circuit comprises a control device which controls a power source of said receiving device using a first power source control signal, and controls a power source of said active filter circuit using a second power source control signal, and
    wherein said control device controls the power source of said receiving device using the first power source control signal, upon reception of data including a plurality of reception slots having a guard bit provided between reception slots adjacent to each other, the first power source control signal becoming a power source ON signal before starting of reception of the data, the first power source control signal becoming a power source ON signal after temporarily becoming a power source OFF signal within the guard bit, and the first power source control signal becoming a power source OFF signal after completing the reception of the data, and wherein said control device also controls the power source of said active filter circuit using the second power source control signal, the second power source control signal becoming a power source ON signal before starting of the reception of the data, and thereafter, maintaining the power source ON signal as an ON signal until the second power source control signal becomes a power source OFF signal after completing the reception of the data.

14. A communication apparatus comprising:

a transceiver circuit including a transmitter circuit which transmits a transmission signal; and a receiver circuit which receives the transmission signal, wherein said receiver circuit comprises:

an active filter circuit including an active filter which filters an inputted transmission signal using a predetermined frequency characteristic, and an adjusting circuit which adjusts the frequency characteristic of said active filter; and a receiving device including a demodulator which demodulates the filtered transmission signal, wherein said receiver circuit comprises a control device which controls a power source of said receiving device using a first power source control signal, and controls a power source of said active filter circuit using a second power source control signal, and wherein said control device controls the power source of said receiving device using the first power source control signal, upon reception of data including a plurality of reception slots having a guard bit provided between reception slots adjacent to each other, the first power source control signal becoming a power source ON signal before starting of reception of the data, the first power source control signal becoming a power source ON signal after temporarily becoming a power source OFF signal within the guard bit, and the first power source control signal becoming a power source OFF signal after completing the reception of the data, and wherein said control device also controls the power source of said active filter circuit using the second power source control signal, the second power source control signal becoming a power source ON signal before starting of the reception of the data, and thereafter, maintaining the power source ON signal as an ON signal until the second power source control signal becomes a power source OFF signal after completing the reception of the data.

15. A receiver circuit comprising:

a front-end circuit which amplifies or frequency-converts an inputted transmission signal;

an active filter circuit including an active filter which filters the amplified or frequency-converted transmission signal using a predetermined frequency characteristic, and an adjusting circuit which adjusts the frequency characteristic of said active filter;

a demodulator demodulating the filtered transmission signal; and a control device which controls a power source of said front-end circuit and a power source of said demodulator using a first power source control signal, and which controls a power source of said active filter circuit using a second power source control signal, wherein said control device controls the power source of said front-end circuit using the first power source control signal, upon reception of data including a plurality of reception slots having a guard bit provided between reception slots adjacent to each other, the first power source control signal becoming a power source ON signal before starting of reception of the data, the first power source control signal becoming a power source ON signal after temporarily becoming a power source OFF signal within the guard bit, and the first power source control signal becoming a power source OFF signal after completing the reception of the data, and wherein said control device also controls the power source of said active filter circuit using the second power source control signal, the second power source control signal becoming a power source ON signal before starting of the reception of the data, and thereafter, maintaining the power source ON signal as an ON signal until the second power source control signal becomes a power source OFF signal after completing the reception of the data.

* * * * *